US012633588B2

(12) United States Patent
Ku et al.

(10) Patent No.: US 12,633,588 B2
(45) Date of Patent: May 19, 2026

(54) BATTERY PACK INCLUDING TEMPERATURE ADJUSTMENT DEVICE

(71) Applicant: LG ENERGY SOLUTION, LTD., Seoul (KR)

(72) Inventors: Jin Woo Ku, Daejeon (KR); Bum Choi, Daejeon (KR); Hee Gyu Kim, Daejeon (KR); Chang Hui Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 562 days.

(21) Appl. No.: 18/029,297

(22) PCT Filed: Jun. 15, 2022

(86) PCT No.: PCT/KR2022/008494
§ 371 (c)(1),
(2) Date: Mar. 29, 2023

(87) PCT Pub. No.: WO2022/265403
PCT Pub. Date: Dec. 22, 2022

(65) Prior Publication Data
US 2023/0420765 A1 Dec. 28, 2023

(30) Foreign Application Priority Data

Jun. 15, 2021 (KR) ........................ 10-2021-0077361

(51) Int. Cl.
*H01M 10/627* (2014.01)
*H01M 10/617* (2014.01)
(Continued)

(52) U.S. Cl.
CPC ....... *H01M 10/627* (2015.04); *H01M 10/617* (2015.04); *H01M 10/635* (2015.04);
(Continued)

(58) Field of Classification Search
CPC ............. H01M 10/627; H01M 10/617; H01M 10/635; H01M 10/643; H01M 10/6554;
(Continued)

(56) References Cited

U.S. PATENT DOCUMENTS

2002/0033692 A1 3/2002 Sakai et al.
2003/0222618 A1 12/2003 Kanouda et al.
(Continued)

FOREIGN PATENT DOCUMENTS

CN 111628239 A 9/2020
DE 19724020 A1 * 1/1998 ............. F28D 15/06
(Continued)

OTHER PUBLICATIONS

The International Search Report (PCT/ISA/210) issued in PCT/KR2022/008494, dated Sep. 29, 2022.
(Continued)

*Primary Examiner* — James M Erwin
(74) *Attorney, Agent, or Firm* — Birch, Stewart, Kolasch & Birch, LLP

(57) ABSTRACT

A battery cell stack includes a plurality of battery cells, a temperature adjuster configured to prevent an increase in temperature of the battery cell stack due to a high external temperature, a heat plate disposed at a lower surface and a side surface of the battery cell stack, a pack case configured to receive the battery cell stack, the temperature adjuster, and the heat plate therein, and a cooling fan configured to discharge heat in the pack case to the outside. The battery cell stack is configured such that, when external power is supplied to an electrical apparatus connected to the battery pack, the battery cell stack does not supply current to the electrical apparatus, and when no external power is supplied to the electrical apparatus, the battery cell stack supplies current to the electrical apparatus.

11 Claims, 2 Drawing Sheets

(51) Int. Cl.

| | |
|---|---|
| *H01M 10/635* | (2014.01) |
| *H01M 10/643* | (2014.01) |
| *H01M 10/6554* | (2014.01) |
| *H01M 10/6556* | (2014.01) |
| *H01M 10/6563* | (2014.01) |
| *H01M 10/6569* | (2014.01) |
| *H01M 10/6572* | (2014.01) |
| *H01M 10/658* | (2014.01) |
| *H01M 50/213* | (2021.01) |

(52) U.S. Cl.
CPC ..... *H01M 10/643* (2015.04); *H01M 10/6554* (2015.04); *H01M 10/6556* (2015.04); *H01M 10/6563* (2015.04); *H01M 10/6569* (2015.04); *H01M 10/6572* (2015.04); *H01M 10/658* (2015.04); *H01M 50/213* (2021.01); *H01M 2220/10* (2013.01)

(58) Field of Classification Search
CPC ......... H01M 10/6556; H01M 10/6563; H01M 10/6569; H01M 10/6572; H01M 10/658; H01M 50/213; H01M 2220/10
USPC ......................................................... 429/120
See application file for complete search history.

(56) References Cited

U.S. PATENT DOCUMENTS

| | | | |
|---|---|---|---|
| 2004/0232885 | A1 | 11/2004 | Sakai et al. |
| 2005/0146223 | A1 | 7/2005 | Kanouda et al. |
| 2005/0206242 | A1 | 9/2005 | Kanouda et al. |
| 2007/0262748 | A1 | 11/2007 | Yamamoto |
| 2008/0268333 | A1* | 10/2008 | Barrella .............. H01M 10/613 429/120 |
| 2011/0300420 | A1 | 12/2011 | Johnson, Jr. |
| 2014/0072844 | A1 | 3/2014 | Oh et al. |
| 2014/0072846 | A1 | 3/2014 | Oh et al. |
| 2015/0101355 | A1 | 4/2015 | Oh et al. |
| 2015/0171486 | A1 | 6/2015 | Rawlinson |
| 2017/0288419 | A1 | 10/2017 | Gleason et al. |
| 2018/0175468 | A1 | 6/2018 | Shin et al. |
| 2018/0269545 | A1* | 9/2018 | Liu ..................... H01M 50/204 |
| 2021/0068292 | A1* | 3/2021 | Liang ........................ H04J 3/16 |
| 2021/0119282 | A1 | 4/2021 | Wünsche et al. |

FOREIGN PATENT DOCUMENTS

| | | | |
|---|---|---|---|
| GB | 2 438 052 | A | 11/2007 |
| JP | 2-244748 | A | 9/1990 |
| JP | 9-93834 | A | 4/1997 |
| JP | 2002-101570 | A | 4/2002 |
| JP | 2003-309935 | A | 10/2003 |
| JP | 2011-49139 | A | 3/2011 |
| JP | 2013-243079 | A | 12/2013 |
| JP | 2015-119626 | A | 6/2015 |
| JP | 2016-192280 | A | 11/2016 |
| JP | 2017-126418 | A | 7/2017 |
| JP | 2018-163760 | A | 10/2018 |
| JP | 2019-16584 | A | 1/2019 |
| KR | 10-2014-0004818 | A | 1/2014 |
| KR | 10-2014-0034352 | A | 3/2014 |
| KR | 10-1371739 | B1 | 3/2014 |
| KR | 10-1558661 | B1 | 10/2015 |
| KR | 10-2015-0131759 | A | 11/2015 |
| KR | 10-2019-0035151 | A | 4/2019 |
| KR | 10-2019-0131415 | A | 11/2019 |
| KR | 10-2020-0034058 | A | 3/2020 |
| WO | WO 2017/122690 | A1 | 7/2017 |
| WO | WO 2018/105610 | A1 | 6/2018 |
| WO | WO 2020/060210 | A1 | 3/2020 |

OTHER PUBLICATIONS

European Communication pursuant to Article 94(3) EPC for European Application No. 22 825 326.6, dated Dec. 18, 2024.
Extended European Search Report for European Application No. 22825326.6, dated Mar. 13, 2024.

* cited by examiner

【FIG. 1】
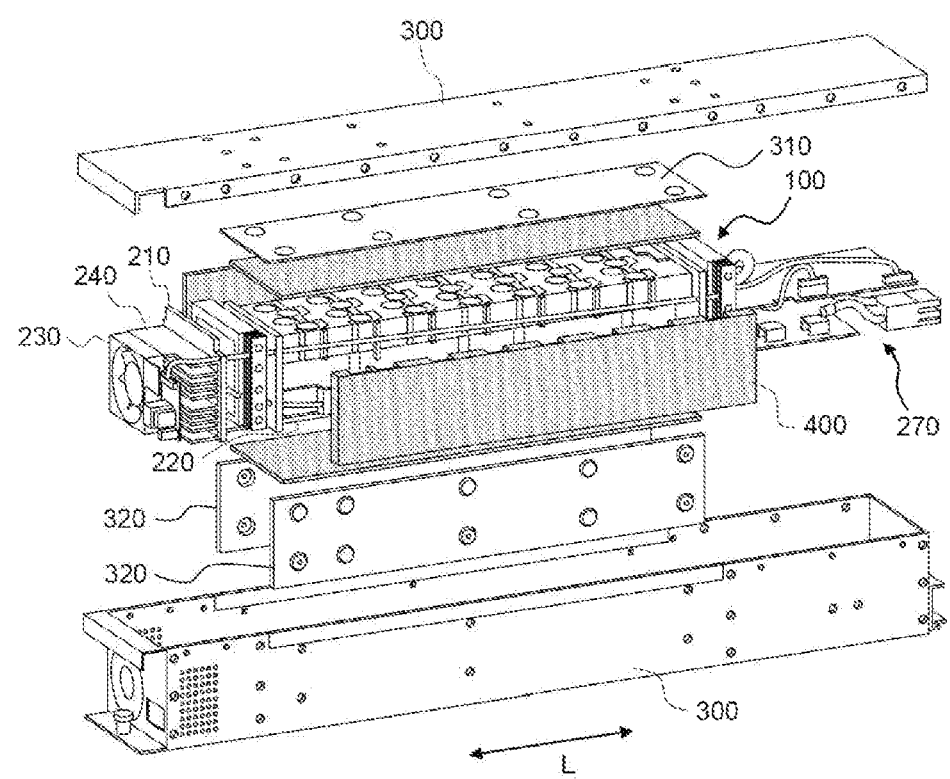
【FIG. 2】
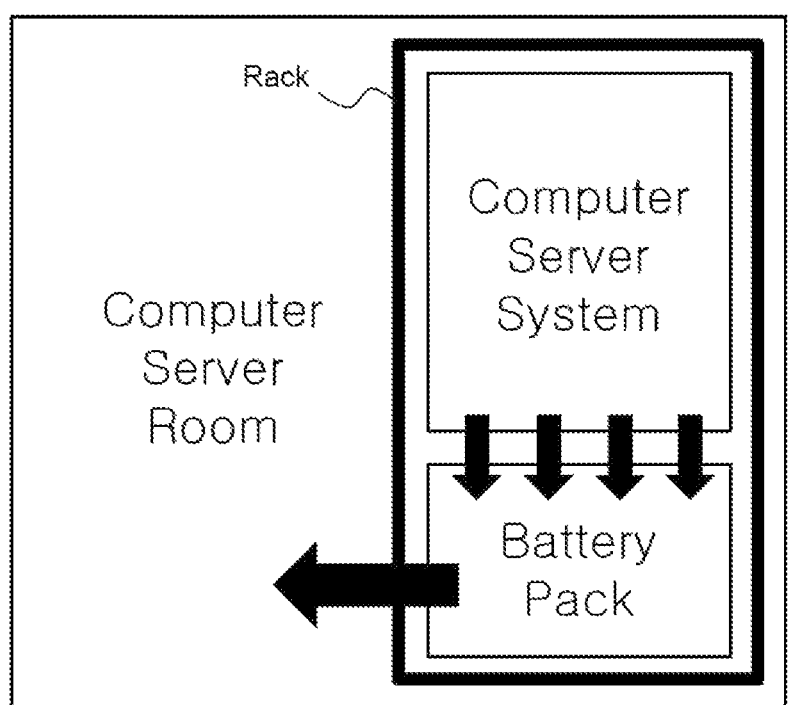

【FIG. 3】
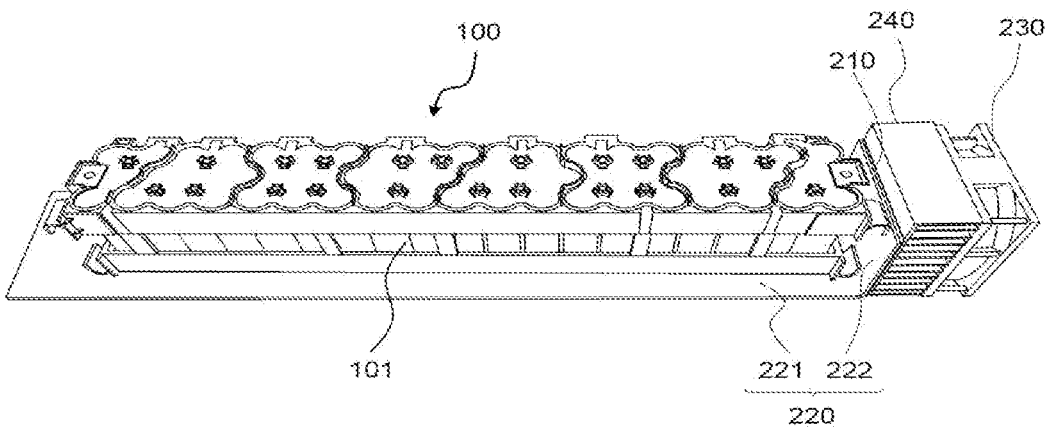
【FIG. 4】
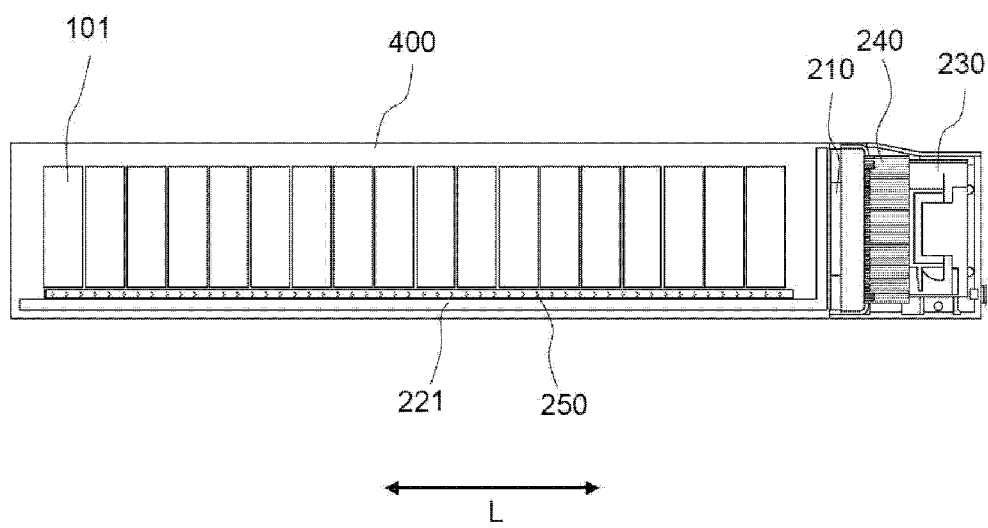
L
【FIG. 5】
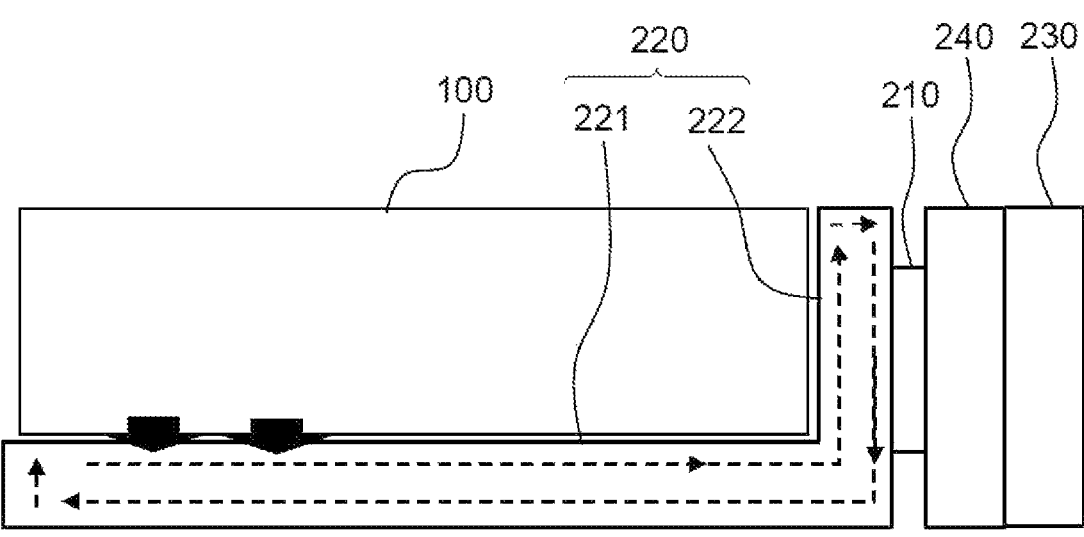

BATTERY PACK INCLUDING TEMPERATURE ADJUSTMENT DEVICE

TECHNICAL FIELD

This application claims the benefit of priority to Korean Patent Application No. 2021-0077361 filed on Jun. 15, 2021, the disclosure of which is incorporated herein by reference in its entirety.

The present invention relates to a battery pack including a temperature adjustment device. More particularly, the present invention relates to a battery pack including a temperature adjustment device capable of maintaining the temperature in the battery pack so as to be lower than the temperature outside the battery pack.

BACKGROUND ART

Facilities that have Internet data centers built as a space for storing various data abruptly increased due to business expansion over the Internet and commercialize safekeeping and management of corporate computer servers or lease of servers have appeared.

Internet data centers must be operated 24 hours a day such that an Internet access environment is always provided. For this reason, the Internet data center is provided with an emergency power system configured to supply emergency power even in an emergency situation, such as power failure.

In general, the emergency power system is installed in a sever room together with a computer server system, wherein the temperature of the server room is increased by heat generated from the computer server system, and therefore a battery pack included in the emergency power system may be exposed to a high-temperature environment.

Even though the battery pack included in the emergency power system is kept in a fully charged state, the lifespan of the battery pack is rapidly reduced when the battery pack is exposed to such a high-temperature environment.

Consequently, there is a need for technology capable of performing control such that the temperature in a battery pack for emergency power systems exposed to a high-temperature environment is not raised, thereby preventing a rapid reduction in lifespan of the battery pack.

In connection therewith, Patent Document 1 relates to an energy storage system including a cooling device configured to circulate air in a housing in order to cool a battery pack, wherein the cooling device includes a Peltier element having a heat absorption portion disposed toward the interior of the housing and a heat generation portion disposed toward the outside of the housing, a first heat sink disposed at the heat absorption portion of the Peltier element, a first cooling fan configured to circulate cooled internal air, a second heat sink disposed at the heat generation portion of the Peltier element, and a second cooling fan configured to circulate external air in order to cool the heat generation portion. When the temperature of the battery pack is equal to or higher than a predetermined temperature, the first cooling fan is operated under control of a controller, and air in the housing cooled while passing through the first heat sink passes through an air circulation passage between batteries to directly cool battery cells.

The battery pack of Patent Document 1 has the structure in which cooled air directly cools the battery cells while being circulated in the housing. Since the volume of the cooing device including the two heat sinks and two cooling fans is large, however, the energy density of the battery pack is lowered.

In addition, since a heat insulation member is mounted only to an outer surface of the Peltier element, the temperature of the outer surface of the housing is easily transferred to the interior of the housing at the part at which the heat insulation member is not disposed.

Patent Document 2 relates to a battery module including a thermoelectric element and a heat dissipation member configured to cool the battery module, wherein the heat dissipation member includes cooling fins interposed at the interfaces between battery cells and a heat dissipation plate having one surface, on which one end of each of the cooling fins is disposed so as to abut, and the other surface, to which the thermoelectric element is attached. Heat transferred from the battery cells to the heat dissipation member is transferred to the thermoelectric element, by which the heat is removed.

In Patent Document 2, the heat dissipation member and the thermoelectric element are disposed so as to directly contact a battery cell stack, whereby heat of each of the battery cells is removed by conduction. Since a structure configured to discharge heat in the battery module to the outside is not included, however, it is not possible to maintain the temperature in the battery module so as to be lower than the temperature outside the battery module.

Therefore, there is a high necessity for technology capable of minimizing an increase in temperature of a battery pack disposed in a high-temperature environment, thereby preventing a decrease in lifespan of the battery pack.

PRIOR ART DOCUMENTS (Patent Document 1) Korean Patent Application Publication No. 2020-0034058 (2020 Mar. 31)
(Patent Document 2) Korean Patent Application Publication No. 2015-0131759 (2015 Nov. 25)

DISCLOSURE

Technical Problem

The present invention has been made in view of the above problems, and it is an object of the present invention to provide a battery pack including a temperature adjustment device capable of maintaining the temperature in the battery pack so as to be lower than the temperature outside the battery pack.

Technical Solution

A battery pack according to the present invention to accomplish the above object includes a battery cell stack including a plurality of battery cells, a temperature adjuster configured to prevent an increase in temperature of the battery cell stack due to a high external temperature, a heat plate disposed at a lower surface and a side surface of the battery cell stack, a pack case configured to receive the battery cell stack, the temperature adjuster, and the heat plate therein, and a cooling fan configured to discharge heat in the pack case to an outside, wherein the battery cell stack is configured such that, when external power is supplied to an electrical apparatus connected to the battery pack, the battery cell stack does not supply current to the electrical apparatus, and when no external power is supplied to the electrical apparatus, the battery cell stack supplies current to the electrical apparatus.

The cooling fan may be disposed at a first end of the pack case in a long axis direction, and the temperature adjuster may be located between the cooling fan and the battery cell stack.

The heat plate may include a planar portion located at the lower surface of the battery cell stack and a lateral portion located between the temperature adjuster and the battery cell stack.

The heat plate may have a space defined therein, and a refrigerant configured to flow depending on temperature may be received in the space.

The refrigerant may move upwards along the lateral portion of the heat plate as the result of being evaporated by heat of the battery cell stack, and after moving upwards, the refrigerant may be cooled by the temperature adjuster, may move downwards, and may move along the planar portion of the heat plate.

The temperature adjuster may be a Peltier element.

The battery pack may further include a heat sink disposed between the temperature adjuster and the cooling fan.

The battery pack may further include a heat dissipation member located between the battery cell stack and the planar portion of the heat plate.

The battery pack may further include a heat insulation material further added to at least a part of an outer surface of the battery cell stack.

The battery pack may further include a heat insulation material further added to an outer surface of the planar portion of the heat plate.

The electrical apparatus may be a computer server system.

The temperature of the battery cell stack may be maintained so as to be lower than the temperature of the computer server system.

In addition, the present invention may provide possible combinations of the above solving means.

Advantageous Effects

As is apparent from the above description, in a battery pack according to the present invention, it is possible to maintain the temperature in the battery pack so as to be lower than the temperature outside the battery pack even though a cooling device is not further provided outside the battery pack.

Even though the battery pack according to the present invention is placed in a high-temperature environment, therefore, the temperature of the battery pack is reduced by itself, whereby it is possible to prevent deterioration in lifespan characteristics of the battery pack.

In addition, since the contact area between a heat plate and a battery cell stack is large, it is possible to rapidly adjust the temperature of the battery cell stack.

In addition, since a heat insulation material is added to an outer surface of the battery cell stack, it is possible to prevent an increase in temperature of the battery cell stack due to a high external temperature even though the battery pack is placed in a high-temperature environment.

DESCRIPTION OF DRAWINGS

FIG. 1 is an exploded perspective view of a battery pack according to the present invention.

FIG. 2 is a schematic view showing movement of heat between a computer server system and a battery pack disposed in a computer server room.

FIG. 3 is a perspective view of some components of the battery pack of FIG. 1.

FIG. 4 is a side view of some components of the battery pack of FIG. 1.

FIG. 5 is a view showing heat transfer in a heat plate.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, limitations described in dependent claims may be applied to all embodiments described in this specification.

Also, in the description of the invention and the claims of the present application, singular forms are intended to include plural forms unless mentioned otherwise.

Hereinafter, an embodiment of the present invention will be described with reference to the accompanying drawings.

FIG. 1 is an exploded perspective view of a battery pack according to the present invention.

Referring to FIG. 1, the battery pack according to the present invention includes a battery cell stack 100 constituted by a plurality of battery cells arranged in tight contact with each other, a temperature adjuster 210 configured to prevent an increase in temperature of the battery cell stack 100 due to a high external temperature, a heat plate 220 disposed at a lower surface and a side surface of the battery cell stack 100, a pack case 300 configured to receive the battery cell stack 100, the temperature adjustment element 210, and the heat plate 220 therein, and a cooling fan 230 configured to discharge heat in the pack case 300 to the outside.

The battery pack according to the present invention is a battery pack for emergency power systems. When external power is supplied to an electrical apparatus connected to the battery pack, therefore, the battery cell stack does not supply current to the electrical apparatus, and when no external power is supplied to the electrical apparatus, the battery cell stack supplies current to the electrical apparatus.

Each of the plurality of battery cells is shown as a cylindrical battery cell. Alternatively, a pouch-shaped battery cell or a prismatic battery cell may be used. FIG. 1 shows the structure in which cylindrical battery cells are mounted in a cartridge so as to be disposed in tight contact with each other.

The temperature of each of the battery cells increases during charging and discharging. The temperature of each of the battery cells may increase not only due to charging and discharging of the battery cell but also due to an external high-temperature environment. When each of the battery cells is placed in a high-temperature environment in a state of being charged, the lifespan characteristics of the battery cell are deteriorated. In order to solve this problem, the present invention proposes technology capable of lowering the temperature of each of the battery cells using the temperature adjuster provided in the battery pack.

In particular, the battery pack according to the present invention is a battery pack for emergency power systems configured to immediately supply power to a computer server system when no external power is supplied to the computer server system, wherein the battery pack may be disposed adjacent to the computer server system. The computer server system continuously discharges heat while being operated 24 hours a day, and the temperature of the computer server system may be about 40° C. or higher.

For this reason, the battery pack for emergency power systems according to the present invention includes a cooling device capable of maintaining the temperature in the battery pack so as to be lower than the temperature outside the battery pack.

The cooling device of the present invention may include a heat plate 220 disposed adjacent to the battery cell stack so as to allow heat of the battery cells, the temperature of each of which has been increased by the external temperature, to pass therethrough, a temperature adjuster 210 disposed in tight contact with the heat plate 220, the temperature adjuster being configured to lower temperature of the heat plate, and a cooling fan 230 configured to discharge heat discharged from the temperature adjuster 210 to the outside of the battery pack.

The cooling fan 230 has a structure configured to discharge heat that circulates in the battery pack, wherein the cooling fan 230 is disposed at one of opposite ends of the pack case 300 in a long axis direction L, and the temperature adjuster 210 is located inside the cooling fan 230.

An heat insulation material 400 may be further added to at least a part of an outer surface of the battery cell stack 100, and FIG. 1 shows the structure in which a plate-shaped heat insulation material 400 is added to each of three outer circumferential surfaces of the battery cell stack in a long axis direction L and a lower surface of the heat plate 220 in the state in which the heat plate 220 is added to a lower surface and one side surface of the battery cell stack 100.

As the area of the heat insulation material 400 added to the outer surface of the battery cell stack 100 is increased, as described above, it is possible to lower an increase rate of the temperature of the battery cell stack due to the temperature outside the battery pack.

Although the kind of the heat insulation material is not particularly restricted, an inorganic heat insulation material, such as polyurethane foam, foam rubber, diatomite, or perlite, may be used.

Meanwhile, in order to measure the temperature of the battery cell stack 100, to allow current to flow in the temperature adjuster 210, or to operate the cooling fan 230, a battery management system (BMS) module 270 may be provided at one side of the battery cell stack. For example, the BMS module may include a voltage management element and a temperature measurement element.

In addition, as shown in FIG. 1, the battery pack according to the present invention may further include an inner cover 310 and an inner tray 320 in order to fix the heat insulation material 400 added to the battery cell stack 100.

FIG. 2 is a schematic view showing movement of heat between a computer server system and a battery pack disposed in a computer server room.

Referring to FIG. 2, the battery pack and the computer server system may be disposed adjacent to each other in the computer server room in a state of being held in a rack. The computer server system dissipates heat while being operated 24 hours a day, and the heat dissipated from the computer server system moves to the battery pack disposed adjacent to the computer server system (as indicated by arrows), whereby the temperature of the battery pack is increased.

Since the battery pack is a battery pack for emergency power systems configured such that, when external power is supplied to the computer server system, the battery pack does not supply current to the computer server system, and when no external power is supplied to the computer server system, the battery pack supplies current to the computer server system, the battery pack may be disposed in a fully charged state.

When the temperature of the battery pack is increased by the heat dissipated from the computer server system, however, the battery cells in the battery pack may be deteriorated, whereby the lifespan of each of the battery cells may be shortened.

In the present invention, the cooling device disposed in the battery pack may be operated in order to discharge the heat of the battery cell stack to the outside of the battery pack (as indicated by an arrow) by itself, whereby it is possible to inhibit an increase in temperature of the battery cell stack and to maintain a uniform temperature of the battery cell stack even though the battery pack is placed in a high-temperature environment. Consequently, the temperature of the battery cell stack may be maintained so as to be lower than the temperature of the computer server system. For example, when the temperature of the computer server system is 40° C., the temperature of the battery pack including the battery cell stack may be maintained at the same level as the interior temperature of the computer server room, i.e., 25° C.

FIG. 3 is a perspective view of some components of the battery pack of FIG. 1, and FIG. 4 is a side view of some components of the battery pack of FIG. 1.

FIG. 3 is a perspective view showing the state in which the heat plate 220 and the cooling device are added to the vicinity of the battery cell stack 100 configured such that the plurality of battery cells 101 is arranged in tight contact with each other, and FIG. 4 is a side view the state in which the heat insulation material 400 is further added to FIG. 3.

Referring to FIGS. 3 and 4, the heat plate 220 includes a planar portion 221 located at the lower surface of the battery cell stack 100 and a lateral portion 222 located inside the temperature adjuster 210.

That is, the heat plate 220 is constituted by the planar portion 221 and the lateral portion 222, which is formed as the result of one end of the planar portion being perpendicularly bent and extending upwards. Consequently, the heat plate is disposed adjacent to the battery cell stack over a large area, whereby heat of the battery cell stack may quickly move to the heat plate 220.

In connection therewith, when, for a battery cell stack including cylindrical battery cells, a top cap of each of the cylindrical battery cells is disposed so as to face the planar portion 221 of the heat plate 220 in consideration of the fact that heat generated from an electrode terminal is highest, it is possible to quickly lower the temperature of the battery cell stack.

In addition, referring to FIG. 4, a heat dissipation member 250 may be disposed between the lower surface of the battery cell stack 100 and the planar portion 221, wherein the space between the battery cell stack 100 and the planar portion 221 is filled with the heat dissipation member 250, whereby the heat dissipation member may be arranged in tight contact with the battery cell stack and the planar portion. Consequently, heat discharged from the battery cells 101 may be quickly transferred to the heat plate 220 via the heat dissipation member 250.

When the heat dissipation member 250 is added to the outer surface of the battery cell stack 100, as described above, the heat insulation material 400 may be further added to an outer surface of the planar portion 221. FIG. 4 shows the structure in which the heat insulation material 400 is added to the entirety of the outer surface of the battery cell stack 100 excluding the lower surface thereof as well as the outer surface of the planar portion 221. However, as shown in FIG. 1, the heat insulation material 400 may be added to three outer circumferential surfaces of the battery pack in a long axis direction L and a lower surface of the planar portion depending on design of the battery pack.

In a concrete example, a Peltier element may be used as the temperature adjuster 210. In addition, a heat sink 240 may be disposed between the temperature adjuster 210 and the cooling fan 230. The heat sink 240 is located adjacent to a heat dissipation portion of the Peltier element, and the cooling fan 230 is located adjacent to the heat sink 240. When the temperature of the battery cell stack is equal to or higher than a predetermined temperature, the Peltier element and the cooling fan are operated, whereby heat generated from the heat dissipation portion of the Peltier element may be discharged to the outside of the pack case.

FIG. 5 is a view showing heat transfer in the heat plate.

Referring to FIG. 5, the heat plate 220 has a space defined therein, and a refrigerant configured to flow depending on temperature is received in the space. Dotted arrows indicate the flow of the refrigerant. When heat of the battery cell stack 100, the temperature of which has been increased by the external electrical apparatus, moves to the heat plate 220, the refrigerant is evaporated and moves upwards along the lateral portion 222, and the upwardly moved refrigerant is cooled by the temperature adjuster 210, such as a Peltier element, moves downwards, and moves along the planar portion 221. In this way, circulation is achieved.

That is, heated air that has moved to a heat absorption portion of the Peltier element, as the temperature adjuster, is cooled via the heat plate and moves to the planar portion, and the cooling fan 230 is operated such that heat exchange is performed between external air and the heat sink, whereby it is possible to discharge heat from the heat absorption portion of the Peltier element to the outside of the battery pack.

In the present invention, as described above, the structure capable of lowering the temperature of the battery cell stack through circulation of the refrigerant in the heat plate is provided, whereby it is possible to maintain low temperature of the battery pack by itself.

Even though the battery pack according to the present invention is disposed in an external high-temperature environment, such as a computer server room, therefore, it is possible to inhibit a decrease in lifespan of the battery pack. In addition, since the discharge rate of the battery pack is low even after long-term use thereof, the battery pack is suitable for preparation against an emergency situation, such as power failure.

Those skilled in the art to which the present invention pertains will appreciate that various applications and modifications are possible within the category of the present invention based on the above description.

DESCRIPTION OF REFERENCE NUMERALS

100: Battery cell stack
101: Battery cell

210: Temperature adjuster
220: Heat plate
221: Planar portion
222: Lateral portion
230: Cooling fan
240: Heat sink
250: Heat dissipation member
270: BMS module
300: Pack case
310: Inner cover
320: Inner tray
400: Heat insulation material

The invention claimed is:

1. A battery pack for emergency power systems, the battery pack comprising:
   a battery cell stack comprising a plurality of battery cells;
   a temperature adjuster configured to prevent an increase in a temperature of the battery cell stack due to a high external temperature;
   a heat plate disposed at a lower surface and a side surface of the battery cell stack, the heat plate having a space defined therein, wherein a refrigerant configured to circulate in the heat plate depending on temperature is received in the space, and wherein the temperature adjuster is configured to cool the heat plate;
   a pack case configured to receive the battery cell stack, the temperature adjuster, and the heat plate therein; and
   a cooling fan configured to discharge heat in the pack case to an outside,
   wherein the battery cell stack is configured such that, when external power is supplied to an electrical apparatus connected to the battery pack, the battery cell stack does not supply current to the electrical apparatus, and when no external power is supplied to the electrical apparatus, the battery cell stack supplies current to the electrical apparatus.

2. The battery pack according to claim 1, wherein the cooling fan is disposed at a first end of the pack case in a long axis direction, and
   wherein the temperature adjuster is located between the cooling fan and battery cell stack.

3. The battery pack according to claim 1, wherein the heat plate comprises:
   a planar portion located at the lower surface of the battery cell stack; and
   a lateral portion located between the temperature adjuster and the battery cell stack.

4. The battery pack according to claim 1, wherein the refrigerant moves upwards along the lateral portion of the heat plate as a result of being evaporated by heat of the battery cell stack, and
   wherein, after moving upwards, the refrigerant is cooled by the temperature adjuster, moves downwards, and moves along the planar portion of the heat plate.

5. The battery pack according to claim 1, wherein the temperature adjuster is a Peltier element.

6. The battery pack according to claim 1, further comprising a heat sink disposed between the temperature adjuster and the cooling fan.

7. The battery pack according to claim 3, further comprising a heat dissipation member located between the battery cell stack and the planar portion of the heat plate.

8. The battery pack according to claim 1, further comprising a heat insulation material further added to at least a part of an outer surface of the battery cell stack.

9. The battery pack according to claim 3, further comprising a heat insulation material further added to an outer surface of the planar portion of the heat plate.

10. The battery pack according to claim 1, wherein the electrical apparatus is a computer server system.

11. The battery pack according to claim 10, wherein the temperature of the battery cell stack is maintained so as to be lower than a temperature of the computer server system.

* * * * *